April 29, 1941.   H. H. AEGLER   2,239,668
BALANCE WHEEL FOR WATCH MOVEMENTS
Filed Sept. 12, 1938
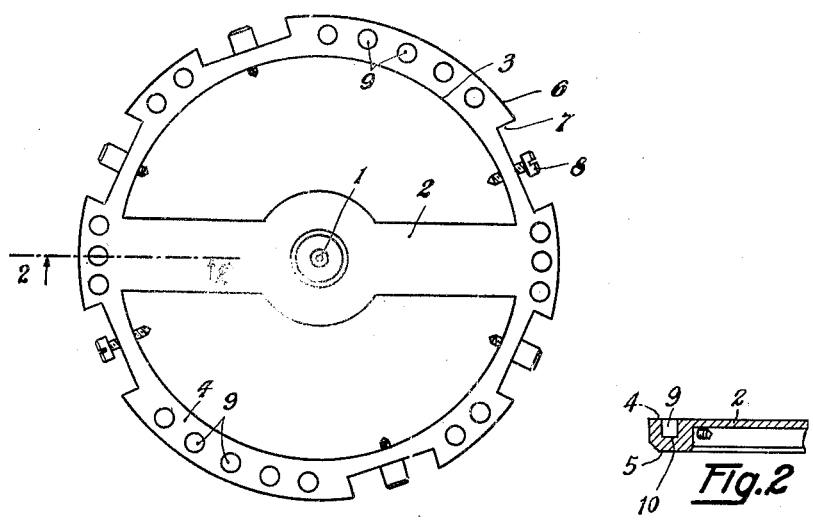
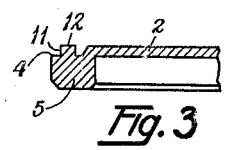
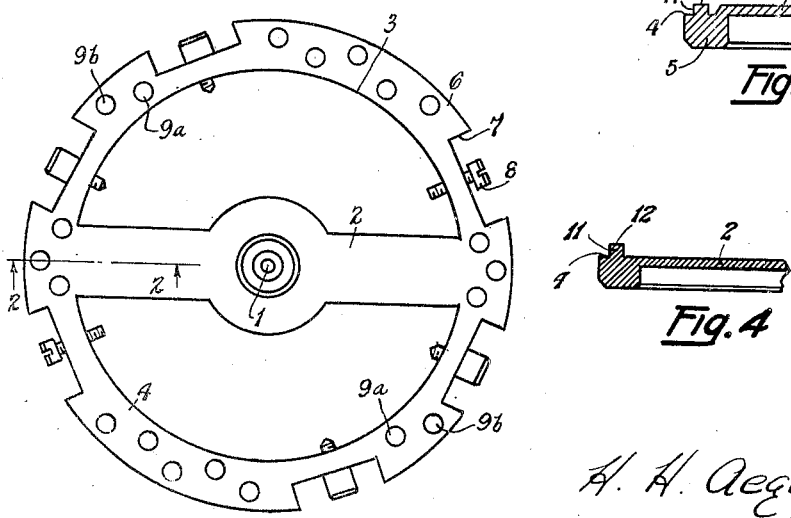
H. H. Aegler, Inventor
by Glascock Downing & Seebold, Attys.

Patented Apr. 29, 1941

2,239,668

UNITED STATES PATENT OFFICE 2,239,668

BALANCE WHEEL FOR WATCH MOVEMENTS

Hans Hermann Aegler, Bienne, Switzerland, assignor to the firm Manufacture des Montres Rolex, Aegler Societe Anonyme, Bienne, Switzerland, a firm of Switzerland Application September 12, 1938, Serial No. 229,612
In Switzerland July 29, 1938

2 Claims. (Cl. 58—107)

The present invention relates to balance wheels used in watches, chronometers and other time pieces of such class, and has for its object to provide means whereby the balancing or equilibrating of such balance wheels may be effected without the use of the ordinary regulating screws or plugs usually employed for that purpose.

It is known that, prior to assembly of the watch movement, the balance wheel is placed in an apparatus for determining whether its center of gravity falls on the geometric axis of the wheel; if not, it is necessary to improve the distribution of the mass on the rim of the wheel; in other words, the balance wheel must be equilibrated.

The present invention has for its object to overcome inconveniences and defects of previous methods and means of equilibration and is concerned therefore with the provision of a balance wheel presenting in the finished state on the top or bottom face of its rim a plurality of smooth cylindrical holes disposed diametrically opposite each other; these holes are not intended to receive exchangeable screws or adjustable plugs but simply afford the retouchable spots where material may be taken off for equilibrating purpose. The balance wheel proper may be constructed in any approved form and the holes provided in great numbers and disposed in any desired manner, it only being essential that said holes be disposed parallel to the axle of the wheel and be closed at the bottom so as to permit the craftsman assembling the watch movement to use a drill for taking off material from the bottom of said holes where a reduction of the mass is found necessary.

While the preferred embodiment of the invention shows the balance wheel provided with dead holes serving the above purpose, it will be seen from two modifications that the retouchable spots might also be provided in form of projections constructed integrally with the rim of the wheel and adapted to be retouched for the same purpose.

The invention will be readily understood from the detailed description which follows, when considered in conjunction with the accompanying drawing in which:

Fig. 1 is a bottom plan view showing the preferred embodiment of the invention and Fig. 2 is a section taken on line 2—2 of Fig. 1. Figs. 3 and 4 illustrate similar sections of two modifications. Fig. 5 is a view similar to Fig. 1 showing a modification of the invention.

The balance wheel shown in Figs. 1 and 2 comprises an axle 1, a cross arm 2 and a rim 3. 4 and 5 designate the horizontal bottom and top faces of said rim, the first facing the bed plate and the second facing the movement bridge not represented. The outer circumference 6 of the rim 3 is cylindrical and is provided with recesses 7 carrying each a regulating screw 8. The rim 3 is provided on its bottom face 4 with a plurality of smooth cylindrical holes 9 extending parallel to the axle 1 and disposed diametrically opposite each other and symmetrically as to the center of the wheel. The bottoms of said holes form small surfaces 10 disposed at one and the same level below the bottom face 4 of the rim.

When testing the balance wheel on the equilibrating apparatus, the craftsman may ascertain that the mass of said wheel must be diminished on one side and he will then introduce a drill into one of the holes 9 and take off some material from the bottom or from the cylindrical wall of said holes. In other words, the craftsman knows where to make the correction and will not fail in choosing the proper spot where to retouch the rim as, for instance, would be the case when taking off material somewhere on the circumference of the rim. It must be stated that instead of taking off material in a hole, some material could be filled into the diametrically opposite hole. Besides, also the screws 8 could be used for the equilibrating purpose, but for convenience of manufacture it might be preferable to omit them.

The holes could also be disposed on several circles concentric to the axis of the balance wheel as shown in Fig. 5.

In this arrangement one set of holes designated at 9a is disposed along one circle and a second set of openings 9b is arranged on a circle concentric with and lying outside of the first circle. The holes of both sets are disposed parallel to the axle and the holes of one set are adapted to be filled or deepened for poising the balance and those of the other set being adapted to be retouched in pairs symmetrically as to the center for fine correction of the radius of inertia.

The Figures 3 and 4 show two modifications, wherein the holes are replaced by small cylindrical projections 11, formed integrally with the rim and set parallel to the axis of the balance wheel; the top faces 12 of said projections are situated on a level above the rim surface 4.

For equilibrating purpose, the craftsman has only to take off material from the top faces 12 by filing the whole face or by boring a hole therein.

In Figure 3, the top faces 12 are all situated at the level of the cross arm 2, and in Figure 4, they are above the level of said arm.

The regulating holes or projections are preferably formed by pressing the full circular plate, the rim and cross arm of which may be shaped afterwards by a stamping process.

While the represented example shows a balance wheel of the monometallic type, it is to be understood that other structural arrangements including portions of different metals may be made which fall within the scope of the appended claims.

I claim:

1. A balance wheel comprising an axle, a rim carried by said axle, said rim being provided with a series of spaced recesses disposed diametrically opposite each other along the outer periphery of said rim so as to form a plurality of segments separated by said recesses, each of said segments being provided with a series of smooth dead holes parallel to the axle and adapted to be filled or deepened for poising the balance, and the recesses being provided with radially directed threaded holes, and regulating screws engaging the threaded holes of said recesses.

2. A balance wheel comprising an axle, a rim carried by said axle, said rim being provided with a series of spaced recesses disposed diametrically opposite each other along the outer periphery of said rim so as to form a plurality of segments separated by said recesses, each of said segments being provided with a series of smooth dead holes parallel to the axle and disposed on at least two concentric circles, the holes of one circle being adapted to be individually filled or deepened for poising the balance, and the holes of the other circle being adapted to be retouched in pairs symmetrically as to the center of the wheel for correcting the radius of inertia of the balance, and the recesses being provided with radially threaded holes, and regulating screws engaging the threaded holes of said recesses.

HANS HERMANN AEGLER.